United States Patent [19]

Efron et al.

[11] Patent Number: 5,048,935

[45] Date of Patent: Sep. 17, 1991

[54] METHOD FOR ADAPTIVE CORRECTION OF THE PHASE NON-UNIFORMITY OF A LIQUID CRYSTAL LIGHT VALVE

[75] Inventors: Uzi Efron, Los Angeles; Bernard H. Soffer, Pacific Palisades; Richard C. Lind, Woodland Hills; David M. Pepper; Thomas R. O'Meara, both of Malibu, all of Calif.

[73] Assignee: Hughes Aircraft Company, Los Angeles, Calif.

[21] Appl. No.: 947,575

[22] Filed: Dec. 24, 1986

[51] Int. Cl.$^5$ .................................................. G02F 1/24
[52] U.S. Cl. .................................. 359/36; 250/201.9; 359/241; 359/276
[58] Field of Search .................. 350/354, 356, 330; 372/9, 12, 18, 29; 330/4.3; 250/201, 213 R, 201.9

[56] References Cited

U.S. PATENT DOCUMENTS

| | | | |
|---|---|---|---|
| 3,967,899 | 7/1976 | O'Meara | 350/611 X |
| 4,013,345 | 3/1977 | Roach | 350/161 S |
| 4,019,807 | 4/1977 | Boswell et al. | 250/213 R |
| 4,249,140 | 2/1981 | Frieberg | 372/29 |
| 4,441,791 | 4/1984 | Hornbeck | 350/360 |
| 4,619,501 | 10/1986 | Armitage | 350/356 X |

OTHER PUBLICATIONS

Warde et al., "High Resolution Adaptive Phase Compensation for Low-Visibility Optical Communication", IEEE, 1980.
O'Meara, "Applications of Nonlinear Phase Conjugation in Compensated Active Imaging", Optical Engineering, vol. 21, No. 2, 1982.
Deuling, "Deformation of Nematic Liquid Crystals in an Electric Field", Molecular Crystals and Liquid Crystals, 1972.
Fisher et al., "Technique for Real-Time High-Resolution Adaptive Phase Compensation", Opt. Soc. Am., 1983.

*Primary Examiner*—Mark Hellner
*Attorney, Agent, or Firm*—V. D. Duraiswamy; W. K. Denson-Low

[57] ABSTRACT

Apparatus for compensating for inherent distortions in a modified liquid crystal light valve used in an integrated wavefront sensing and wavefront control system for laser optics. A main wavefront sensing and control system utilizes a liquid crystal light valve selected for response speed but having inherent surface non-linearities. A beam from an auxiliary laser is intermittently applied, while the main laser is blocked, to both the fast response LCLV of the main system and to a slower response LCLV of an associated correction system. The second LCLV system corrects for the non-linearities in the surface of the first LCLV and then maintains the stored correction signal for a decay interval which corresponds to several response times of the main LCLV, thus permitting the main LCLV system to perform fast correction of atmospheric aberrations in the laser beam wavefront unaffected by inherent surface non-linearities.

10 Claims, 5 Drawing Sheets

METHOD FOR ADAPTIVE CORRECTION OF THE PHASE NON-UNIFORMITY OF A LIQUID CRYSTAL LIGHT VALVE

CROSS-REFERENCES TO RELATED APPLICATIONS

The subject matter of this application is related to patent application Ser. No. 865,231, filed May 20, 1986 and assigned to the assignee of this application.

BACKGROUND OF THE INVENTION

1. Field of the Invention

This invention relates to laser beam projection systems utilizing controllable reflectors to compensate for medium-aberrated waves and, more particularly, to such systems utilizing an additional controllable reflector to compensate for aberrations inherent in the principal controllable reflector.

2. Background Information

Since the invention of the laser in the 1950s, a great number of applications have been developed for exploiting the spectral purity and spatial coherence of the laser beam. Communications, data transfer, and the projection and processing of images have come to depend upon the unique properties of the coherent laser wavefront. These properties must be preserved if the powerful and beneficial qualities of laser radiation are to be fully utilized. Except in free space, a laser beam travels through a material medium and the wavefront quality of the laser beam is reduced: high spatial quality waves become aberrated; plane waves emerge with randomly perturbed wavefronts. The diffraction associated with such aberrated waves significantly reduces the ability to focus the beam to a high-quality beamspot or to efficiently transmit a communications signal to a remote receiver.

Another problem occurs when such laser wavefronts are transmitting large amounts of energy. Some portion of that energy is absorbed when it passes through a given optics system of lenses, mirrors, and other optical devices, or when it travels through the atmosphere. Typically, when materials absorb energy and heat up, their index of refraction changes. This change in index varies across a given beam profile. The intensity of the beam and the amount of heat absorbed vary as a function of location within the beam. Differences in index cause refraction of a laser beam. The consequent spreading of the high-energy laser beam due to a laser-induced index differential is termed "thermal blooming". Due to thermal blooming, the beam which arrives at its target has spread too far, and even if it is focused, the phase of the beam across its wavefront is so randomized that on the whole it destructively interferes and cancels itself out. Thus the laser beam delivers only a small fraction of the energy being transmitted to the receiving site.

In order to counteract these deleterious effects of atmospheric turbulence, thermal blooming, and irregularities within the optical train, adaptive optical systems have been explored and developed. These systems combine wavefront sensing and wavefront correction within a closed feedback loop in order to correct a particular laser beam's wavefront errors. A typical laser beam direction system might work as follows. A laser beam is directed via an atmospheric path to a target or receiving site. Because of turbulence and thermal blooming, only a portion of the radiation reaches the target. In some systems, a laser reference is transmitted back through the atmosphere in order to be used as a probe wave which samples the atmospheric aberrations the light has encountered. In essence, the return signal contains in its wavefront phase all the aberrations of the beam path. If the phase aberrations are then sensed and the laser beam is pre-aberrated to correspond to this phase pattern, during its propagation through the atmosphere, the laser will retrace the path of the target radiation and arrive at the target unaberrated; the full amount of beam energy will then have been transferred.

A variety of apparatus and methods have been developed or proposed for this type of beam correction. These include deformable mirror systems and phase conjugation approaches using nonlinear optical media.

Deformable mirror systems suffer from a great number of inherent problems. The use of discrete, bulky electrical actuators limits the spatial frequency response for the mirror; a deformable mirror simply cannot correct errors finer than the spacing of the push-pull actuator elements. In addition, such actuators typically require several thousand volts for operation and are subject to arc-overs and permanent breakdowns. Their impedance combined with the mass of the mirror surface limits the temporal frequency response of the adaptive system. Each detector/actuator feedback loop requires discrete electronic processing systems and considerable amplification to function properly. Since the thin front surface of the mirror continuously experiences flexures, it suffers from eventual drift and creep problems with consequent loss in performance.

Nonlinear optical media, using degenerate four-wave mixing, stimulated Brillouin or Raman scattering, can provide a time-reversed wave as an output in some applications. While this phase-conjugation method greatly improves the spatial resolution of the system since the "actuator spacing" is now molecular, it also presents certain problems. The input sensitivity is very low, so that a fairly large return signal is necessary in order to set up the proper index grating structure within the phase-conjugation cell. Such power requirements rule out this method for lower-power optical communication and data transfer systems. In addition, the pump beams require an enormous amount of energy and must be precisely aligned for the device to function. The wasted costs of duplicate high-energy lasers for pumping the medium and the resulting low efficiency conversion and transmission of the energy to the target make phase conjugation an interesting but often impracticable means for adaptive optics applications.

An alternative approach to the phase-conjugation method mentioned above involves the use of a liquid crystal light valve incorporating a self-adaptive control system to combine both wavefront sensing and wavefront correction in a single package. Boswell et al in U.S. Pat. No. 4,019,807 disclose one particular version of a standard liquid crystal light valve (LCLV). If the usual liquid crystal element in that disclosed device is replaced with a parallel-aligned tunable birefringent liquid crystal substrate, the modified LCLV device can be used as a deformable mirror. It thus finds particular utility in the wavefront sensing and correction system. A number of benefits flow from the use of such an LCLV in this type of system. The LCLV itself requires no signal processing, electric amplification, or high-voltage sources. It possesses a spatial resolution of approximately 30 microns per pixel, far better than the typical deformable mirror which may have 16 to 60 pixels spread over an area of 100 square centimeters.

In such a system, aberrated light from the target, degraded by all the distortions of its travel path, passes through the substituted liquid crystal element, reflects off a dielectric mirror, passes through the liquid crystal element once more, and is transferred by various optical means to the back side or photoconductor side of the LCLV where it combines with a locally generated unaberrated wavefront. The two combined wavefronts create an interference pattern which through careful alignment is in exact registration with the incident target wavefront hitting the front side of the LCLV. A photoconductive layer lies sandwiched behind the liquid crystal element between the dielectric mirror and one clear conductive substrate. Once a voltage is placed across these conductors, any change in resistance in the photoconductor due to absorbed radiant energy engenders a commensurate change in voltage across the liquid crystal element at that point. The interference pattern impinging on the photoconductive layer provides such a source of radiant energy and the pattern represents an exact spatial mapping of the wavefront errors of the incoming target radiation. Hence, voltages across the liquid crystal element will change at precisely those points where the phasefront of the target radiation is aberrated. The refractive index and hence optical path length of the liquid crystals will change at those points due to the applied field. Thus, these microscopic phase-shifting elements will "push or pull" the incoming wavefront until a uniform interference pattern is obtained upon the photoconductive side of the liquid crystal light valve device, at which point the servosystem is in equilibrium.

When the interference pattern is uniform, the incoming wavefront is completely corrected and the liquid crystal "mirror" can be used to reflect a pre-aberrated high energy laser beam so that it arrives at a given target point completely unaberrated. Since the LCLV typically requires very little power to produce the desired phase modulation effects, the element can also be used to great advantage in very precise image and data processing systems. Moreover, the rather uniform wavelength dependence of the phase shifts created in the liquid crystal mirror allows multiple wavelength use of the device, just as in conventional deformable mirror technology.

Modified silicon liquid crystal valves (LCLVs) have been selected for use in the system described above for adaptively correcting for atmospheric aberration because of the relatively quick response of the thin silicon device. However, the modified silicon LCLV presents one disadvantage in that it exhibits an inherently high optical non-uniformity. Methods to improve the output uniformity of such systems have been proposed, utilizing external fixed correction plates. However, these plates, which must be made separately for each light valve, are difficult to manufacture and furthermore they cannot be adapted to changes in the light valve structure which may occur over long periods of time. A more effective way of compensating for the optical non-uniformity of the modified silicon LCLV is needed if systems incorporating the LCLV are to reach their full potential.

SUMMARY OF THE INVENTION

In brief, arrangements in accordance with the present invention incorporate an additional wavefront correcting LCLV and associated feedback control system to provide correction for the limitations of adaptive optics wavefront correction systems utilizing the thin silicon LCLV.

One of the principal drawbacks of the adaptive optics system using a single or "main" silicon LCLV is that the fast-response, silicon LCLV has a poor surface quality, leading to a reduced output uniformity. The dynamic (phase) range of the device is limited because a relatively thin liquid crystal layer must be used to obtain the fast response. Although the spatial phase-non-uniformity of the silicon LCLV can be corrected by the LCLV valve itself in closed loop operation, this is not a desirable solution because it will use up a significant portion of the already limited dynamic range of the device.

The deficiency of the single LCLV adaptive optics system is compensated for, in accordance with the present invention, by the use of a second "corrector" LCLV valve as an adaptive corrector for the main LCLV. The second LCLV has a large dynamic range compared to the main LCLV. Thus it can correct for the main LCLV surface non-uniformities as well as for its own distortions. The LCLV used in the correcting system typically has surface non-uniformities which are much less severe than in the thin silicon LCLV of the main system.

There are two phases in the operation of this system. In the first "set mode" phase, the main LCLV feedback loop is disengaged by using an appropriate shutter, and an auxiliary laser is used to drive the wavefront to zero through the auxiliary system coupled to the second LCLV. At the end of the "set mode" period, the wavefront error is driven to zero. At this point, the main operational phase is initiated by activating the main laser, enabling the main feedback loop and disrupting feedback to the compensator LCLV, using appropriate shutters in the second correction loop. Since the corrector LCLV is slow, due to the thick liquid crystal cell which is employed, it will continue to "hold" the modulation information for a certain decay time. Therefore, for the duration of the decay time (which can be up to a number of seconds, whereas the response time of the main laser system is on the order of milliseconds) the main LCLV valve will only have to correct for the atmospheric aberrations, since the corrections for its own aberrations are incorporated in the main wavefront. This sequence of "set" and "operation" modes can be repeated with the maximum period being set by the response (decay) time of the corrector LCLV.

This arrangement, by eliminating the necessity of self correction from the main LCLV, allows it to perform correction of the atmospheric aberration faster and with optimal utilization of its limited dynamic range. Systems incorporating the disclosed features of the present invention can also be used as general adaptive correctors for high or low spatial frequencies, and for slowly varying errors in existing adaptive optics systems, such as pin cushion errors, optical element variations, thermal distortion of mirrors, and the like.

In one particular arrangement in accordance with the invention, the second corrector LCLV comprises a cadmium sulfide LCLV to correct for the output distortion of the main silicon LCLV. By virtue of the different material which is used, and the increased thickness of the CdS-LCLV, the large dynamic range provided by the second LCLV is effective in achieving the desired operation of the invention. If desired, a thick silicon LCLV may be used for the second LCLV, although the cadmium sulfide LCLV is preferred as the corrector unit.

DESCRIPTION OF THE DRAWINGS

A better understanding of the present invention may be realized from a consideration of the following detailed description, taken in conjunction with the accompanying drawings in which.

DESCRIPTION OF A PREFERRED EMBODIMENT

A preferred integrated adaptive optics system utilizing a modified LCLV for use in conjunction with the present invention is disclosed in co-pending patent application Ser. No. 865,231, entitled "Integrated adaptive Optics Apparatus", of T. R. O'Meara et al, filed May 20, 1986 and assigned to the assignee of the present application. The subject matter of application Ser. No. 865,231 is incorporated by reference herein and, further, is reproduced in part.

Figure 1:
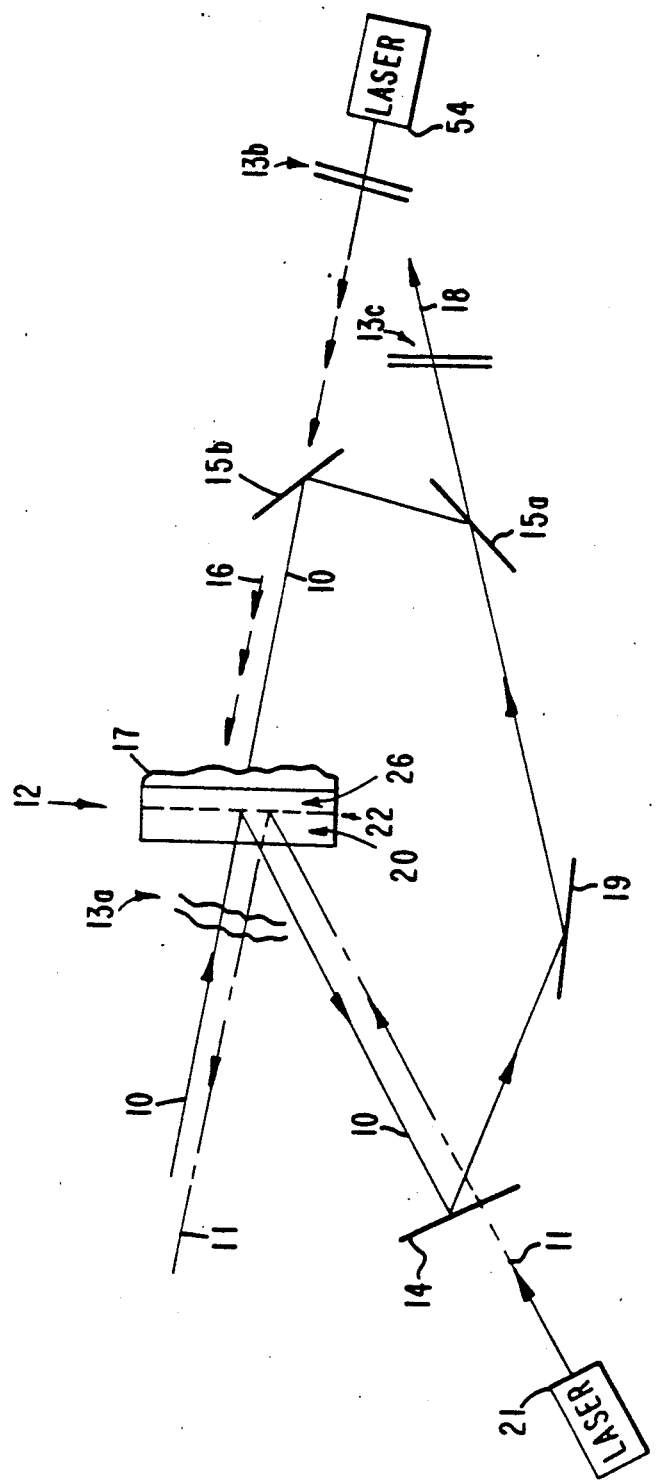
FIG. 1 is a schematic view of a liquid crystal light valve adaptive optics system incorporating a modified liquid crystal light valve, such as may be incorporated in embodiments of the present invention. Illustrated are a series of beam splitters and ray traces of target return, local reference, and reflected wavefronts.

FIG. 1 is a schematic diagram revealing an adaptive optics system utilizing a liquid crystal light valve (LCLV) 12 to correct phase errors in incoming coherent light reference light beam 10, indicated by wavefronts 13a which represent the aberrated wavefront in need of correction, first strikes the liquid crystal light valve 12. The remote reference wavefront 10, after passing through the depth of the liquid crystal 20, reflects off an internal dielectric mirror 22, and passes through the liquid crystal 20 once again. The remote reference wavefront 10 then reflects off an aperture-sharing component (or beamsplitter) 14, reflective element 19, and beamsplitters 15a,b to be combined with a local reference plane wave 16 at the rear of the liquid crystal light valve 12.

The local reference plane wave 16, whose plane wavefront is indicated by 13b, interferes with the remote reference wavefront 10, thus creating the characteristic light and dark patterns of interfering light. Local laser oscillator 54 provides the local reference 16 with the same wavelength as the remote reference 10. Where both wavefronts are in phase, i.e., when the remote reference 10 approximates a corrected plane wave, constructive interference, or a bright spot, results. Where the two waves are out of phase, i.e., when the remote reference 10 is aberrated with respect to a perfect plane wave, destructive interference, or a dark region, occurs. The resulting interference pattern 17 of light and dark areas, a map of the residual phase error for the reflected remote reference light, illuminates the photoconductive side 26 of the LCLV 12. The photoconductor side of LCLV 12 is herein referred to as the "back or rear side" of LCLV 12. As explained further on, the inherent feedback of the LCLV 12 drives this phase error towards zero, at which point the incoming wavefront is well-corrected. This corrected wavefront 18 may exit through beamsplitter 15a and is illustrated by wavefronts 13c.

Figure 2:
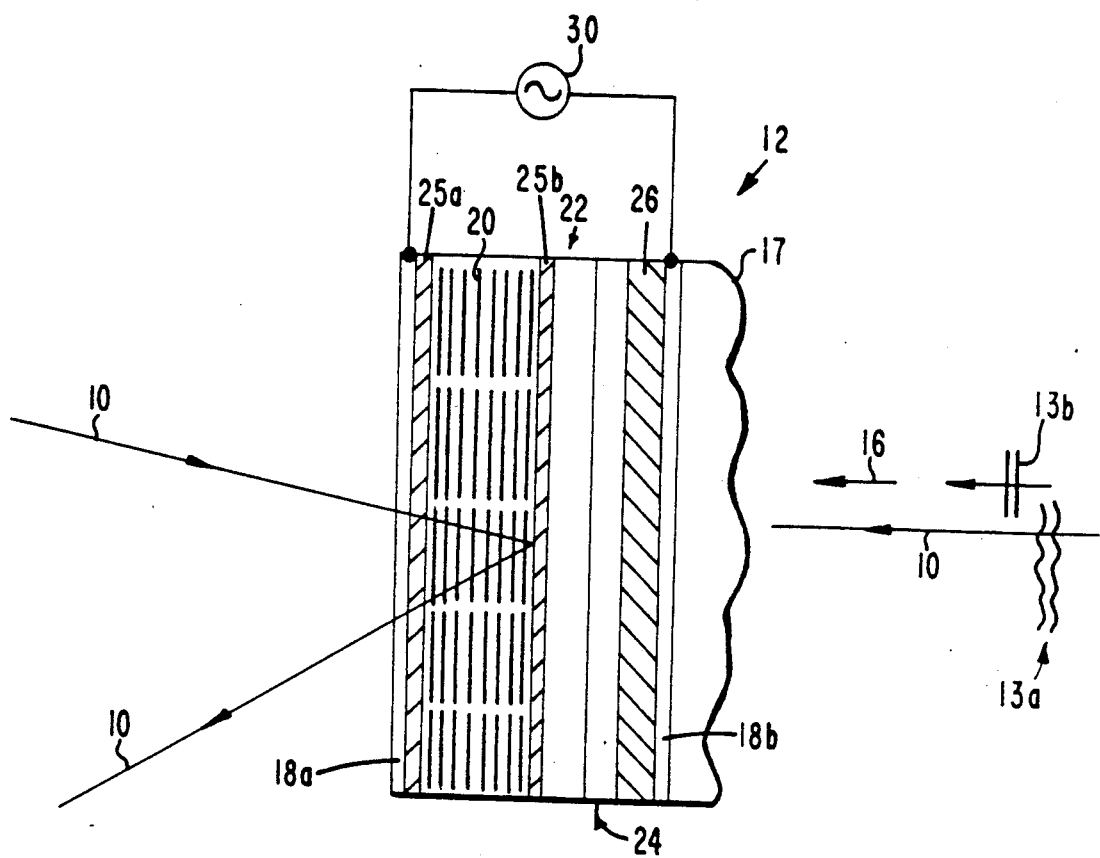
FIG. 2 illustrates the composition of a particular liquid crystal light valve utilized in embodiments of the present invention.

FIG. 2 illustrates the particular liquid crystal light valve suitable for this adaptive optics application. The liquid crystals themselves must be composed of parallel-aligned birefringent molecules that do not induce any polarizing effects upon the reflected wavefront. (The standard liquid crystal light valve, Hughes Model H-4060, uses nematic liquid crystals which are twisted. Hence, the crystals polarize incident light in various, here undesirable, ways.) The new liquid crystals' function depends on their ability to alter their index of refraction with orientation: in other words, it depends upon their electro-optic birefringence. Indeed, any substance capable of altering its index with applied voltage without inducing any further polarizing or amplitude modulation effects can be used for the present purpose. With no applied electric field, the liquid crystal alignment layers 25a,b force all the liquid crystal molecules to remain parallel and present a constant index of refraction throughout their depth to any incoming wavefront. If an electric field is applied to a segment of the liquid crystal layer 20, the molecules of that segment rotate and the index of refraction for that segment of the liquid crystal device changes.

Figure 3A:
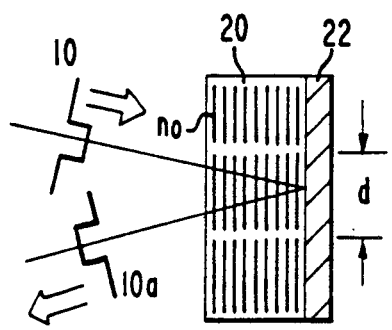
FIG. 3 illustrates the operation of the liquid crystal layer of a liquid crystal light valve in correcting spatial phase distortion in an incoming remote reference wavefront, the views of FIGS. 3a and 3b corresponding to before and after correction, respectively.
Figure 3B:
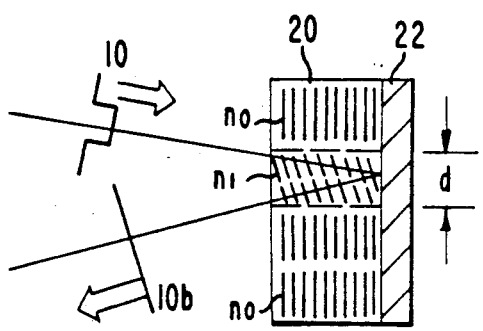

FIG. 3 demonstrates how this index alteration corrects wavefront errors. FIG. 3a illustrates a liquid crystal device with a remote reference wavefront 10 passing through the liquid crystal 20, reflecting off the dielectric mirror 22, passing through the liquid crystal once more, and emerging as the output wavefront 10a. The remote reference wavefront 10 has an aberration shown in FIG. 3 as a notch; that portion of the wave is traveling ahead of the wavefront. The liquid crystal has a quiescent, i.e., unrotated, index $n_o$ throughout its breadth and the reflected wavefront 10a exactly matches the input wavefront 10; no wavefront correction has occurred.

When a voltage is applied across the proper portion of the liquid crystal (the mechanism for this voltage application is explained further on) denoted by dimension d, the index of refraction for that portion increases to $n_1$, due to the rotation of the birefringent liquid crystals. The optical path length for that part of the liquid crystal therefore also increases, retarding any wavefront passing through that section. Hence, when the index change is correct, the notch of wavefront 10, after traversing the liquid crystal device, has been pulled back and is now in line with the remainder of the wavefront 10b. At that point, the wavefront is corrected.

The implementation of these unique properties of birefringent liquid crystals for the correction of wavefronts, particularly the proper application of voltages across the breadth of the liquid crystal element, is accomplished by the remaining elements of the LCLV 12.

After the remote reference wavefront 10 passes through the liquid crystal device 20 and reflects off the dielectric mirror 22, to be combined with the local reference wavefront 16 at the rear of the LCLV 12, the resulting interference pattern 17 transfers through the rear transparent electrode 28b and images onto the photoconductive substrate 26. This imaged pattern must have exact registration with respect to the remote reference wavefront 10 impinging upon the other side of the light valve in order for proper wavefront correction to occur.

A voltage source 30 connected to the two transparent electrodes 28a,b places a potential drop across the combination of liquid crystal 20 and photoconductive substrate 26. This voltage should be 6 Volts for a cadmium sulfide photoconductor and at 10 KHz in frequency. The operation of the photoconductor heterojunction with such an ac voltage supply is taught in the above-mentioned Boswell et al U.S. Pat. No. 019,807 the disclosure of which is incorporated herein by reference. A light-blocking layer 24 separates the liquid crystal portion 20 from the wavefront beam 10 from directly stimulating the photoconducting substrate 26. If light from the interference pattern 17 strikes the photoconductive substrate 26, the intensity pattern liberates photoelectrons, causing a small current to flow and hence the voltage to change across the liquid crystal 20 itself. This voltage change, proportional to the brightness of the interference pattern 17, generates a commensurate index change in the liquid crystal 20.

Summarizing the process described thus far, any wavefront error in the remote reference beam 10, by interfering with the perfect plane wave of the local reference 16, produces an interference pattern 17 upon the photoconductor 26. The intensity variations of the interference pattern 17 represent an exact map of the wavefront errors for the remote reference wave 10 entering the front side of the LCLV 12. The current created by these intensity variations of the interference pattern 17 changes the voltage across the liquid crystal 20 directly behind the location of said variations. The electrically-engendered rotation of the liquid crystals alters their index of refraction proportionately until the phases of those points on the wavefront are brought back to their proper values. By using such negative feedback, the liquid crystal light valve 12 drives any wavefront error in the reflected remote reference wavefront to zero. The resulting output wavefront 18 emerges through beamsplitter 15a corrected for wavefront phase errors. In some applications, the production of this corrected wavefront 18 is the sole desired result.

In other applications, a second conjugate wavefront must be generated using a higher-power beam which propagates over the same atmospheric path as the remote reference 10. Once the LCLV device 12 has responded to the received remote reference wavefront 10 and has altered the orientation of the liquid crystal molecules to compensate for any wavefront phase errors, the liquid crystal layer 20 can function just as a deformable mirror in an adaptive optics system. A second light wavefront, often a higher-energy laser beam, can be directed through the aperture-sharing component 15 and launched off the liquid crystal device 20 in a reverse direction to the incoming remote reference wavefront 10. This higher energy laser beam will acquire all the phase information patterned within the liquid crystal layer, and will be predistorted in a time-reversed phase-conjugate sense. "Time-reversed phase-conjugate" signifies that the wave exactly resembles the incoming wavefront, except that it travels backwards in space, as if a motion picture of the wavefront reversed itself in time. The predistorted beam traverses all the atmospheric and other system aberrations to arrive at a target as a perfect wavefront. The liquid crystal light valve is a simple, compact solid-state device that combines the multiple wavelength utility of reflective deformable mirrors with the extraordinarily high resolution of the phase-conjugation cells while avoiding many of their disadvantages.

Efficient operation of the above-described liquid crystal light valve adaptive optics system requires certain further refinements. The phase as well as the frequency of the local reference wavefront source 16 must be maintained relative to the remote reference wavefront 10. Additionally, the optical transfer system made up of those components which guide the remote reference wavefront 16 around the LCLV device 12 to be combined with the local reference wavefront 16 must fulfill certain critical requirements for the device to function.

Figure 4:
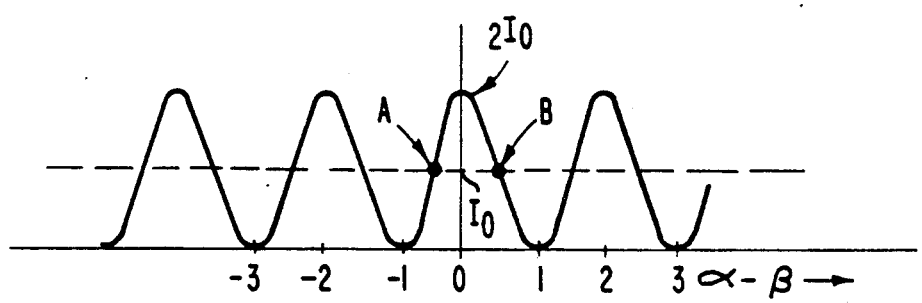
FIG. 4 is a plot of amplitude of an interference pattern developed between a remote reference waveform and a local reference as shown in FIG. 1.

In order to maximize the sensitivity of the present invention to small phase errors in the remote reference wavefront 10, the phase of the local reference plane wave 16 should be offset by $\pi/2$ radians from the mean phase of the remote reference wavefront 10 reflected from the front of the liquid crystal 20. FIG. 4 illustrates this requirement. If at any point x the remote reference wavefront 10 is described by $$U_{rr} = U_o \exp[i\alpha(x)]$$

while the local plane wave reference field 16 is given by $$Ul_r = U_o \exp[i\beta]$$

then the composite intensity of the interference pattern 17 varies according to $$I = I_o[1 + \cos(\alpha - \beta)]$$

as illustrated in FIG. 4. If there is no reference offset, the system will function around $\alpha - \beta = 0$ with no sensitivity to small wavefront errors $\alpha$. However, a reference offset of $\pm\pi/2$ shifts the operation of the system to either point A or point B, depending upon whether the loop gain for the phase-shifting system is negative or positive. In the preferred embodiment the overall system feedback is negative. At these operating regions, the system has maximum sensitivity to small relative phase shifts between the remote reference 10 and local reference 16 wavefronts, and hence optimum signal-to-noise performance.

Figure 5:
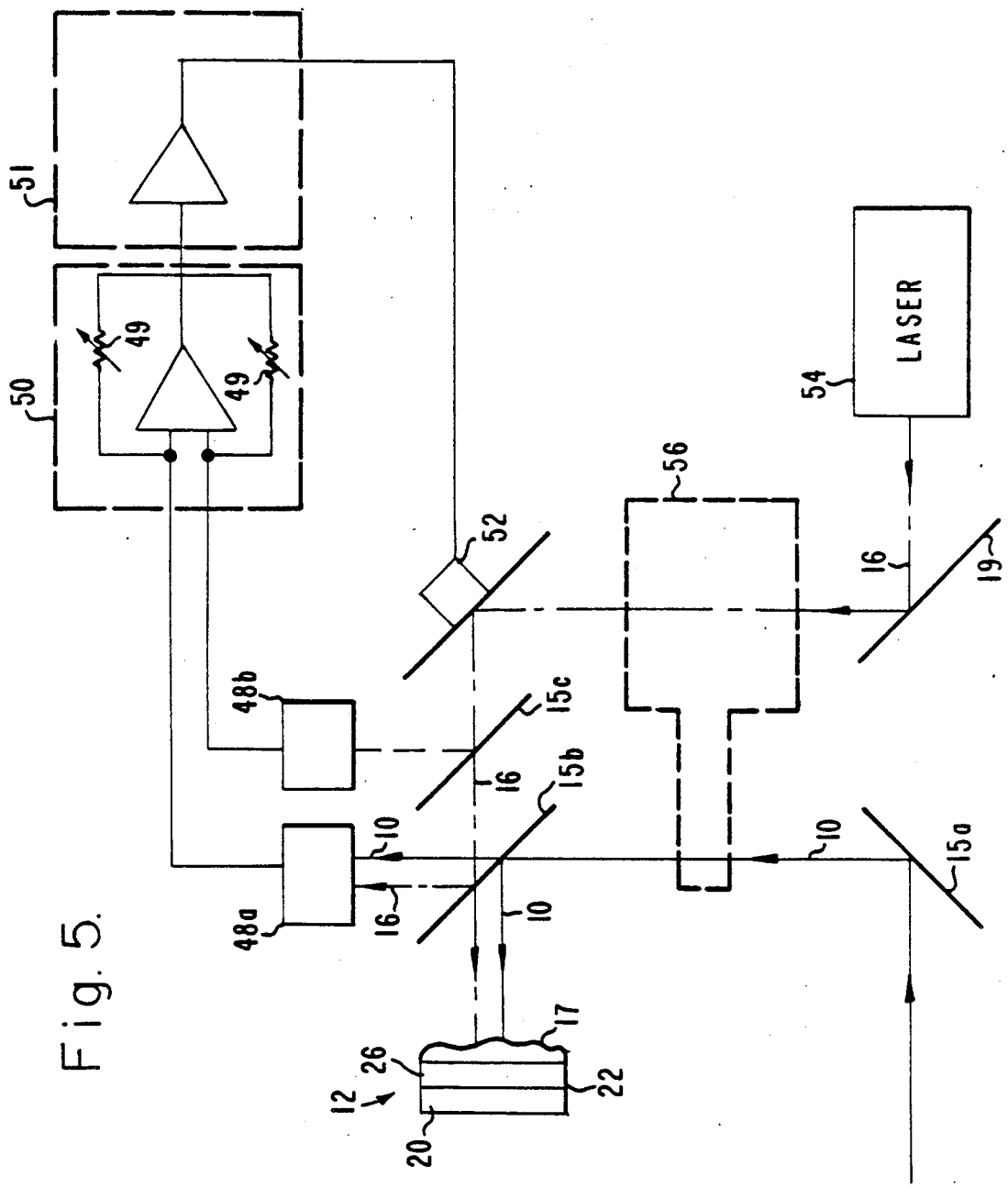
FIG. 5 is a schematic diagram of auxiliary apparatus to FIG. 1 for maintaining the relative phase between the local reference wavefront and the incoming remote reference wavefront.

FIG. 5 shows an approach for maintaining such a local reference phase shift. Two detectors 48a,b are employed. For visible wavelengths, these detectors can be standard p-i-n detectors, comprising a pin-hole aperture and photoelectric element. The voltage of such a detector is proportional to the light intensity passing through the pin-hole. Alternatively, the detector may be a silicon avalanche photodiode. One detector 48a measures the characteristic interference between the remote reference 10 and the local reference 16 wavefronts as shown in FIG. 4. The second detector 48b measures just the strength of the local reference wave 16 alone. The differential operational amplifier (Op-Amp) 50, used conventionally with adjustable resistors 49, provides a difference signal from these two detectors which, amplified by a PZT amplifier 51, such as a Burleigh Model PA-70 drives a piezoelectric mirror 52. Since the difference signal exhibits a null precisely at the desired operating points ($\pi/2$ radians offset) shown in FIG. 4, the local piezoelectric servo 52 will drive the system to a lock point at either point A or B in FIG. 4, depending upon the sign of the feedback gain. At that point, the local reference plane wave 16 will be exactly $\pi/2$ radians out of phase with the mean phase of the remote reference wavefront 10. Block 56 represents a frequency control stage for minimizing the frequency differences between the two light waves from the local and remote references. This may be effected, for example, by using a heterodyne detector in the block 56 to control the local laser oscillator 54 in accordance with detected differences in the waves 10 and 16.

Figure 6:
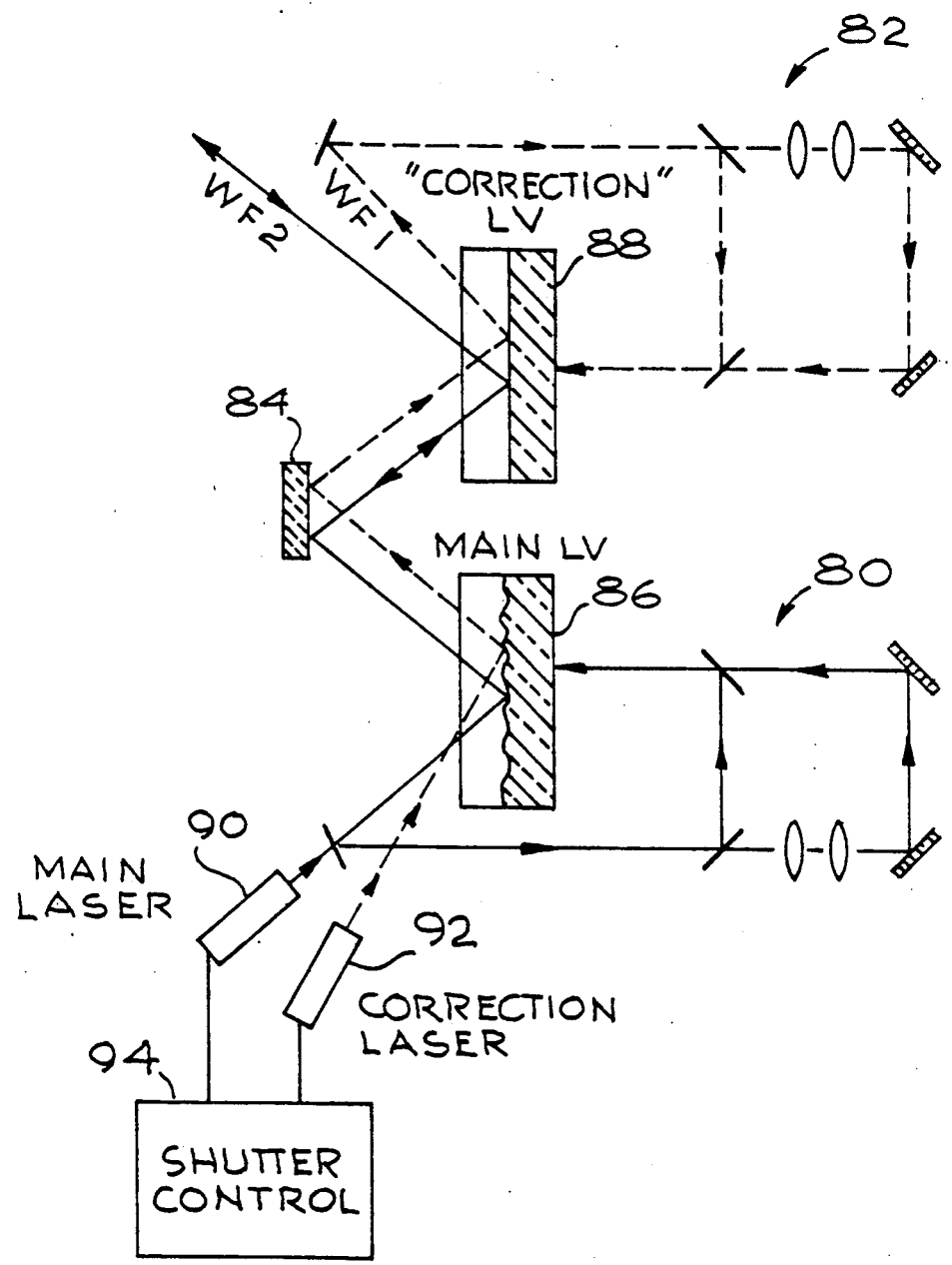
FIG. 6 is a schematic diagram representing a preferred embodiment of the present invention incorporating a plurality of circuit arrangements such as are shown in FIGS. 1 and 5.

FIG. 6 is a schematic diagram illustrating a dual LCLV system for correcting for the phase non-uniformity of the LCLV in a single adaptive optics system, such as has been described hereinabove principally in connection with FIGS. 1 and 5. The overall system of FIG. 6 is shown comprising a main system 80 operated in conjunction with a correction system 82 intercoupled via a mirror 84. The systems 80, 82 correspond generally to the adaptive optics system of FIGS. 1-5 as described. The difference between the two systems 80, 82 of FIG. 6 resides in the particular LCLV which is incorporated therein. The system 80 includes as the main light valve a fast response silicon LCLV 86. Because a relatively thin liquid crystal layer must be used to achieve the fast response, the device 86 has a poor quality of reflective surface and exhibits significant spatial phase-non-uniformity. The correction system 82, on the other hand, includes an LCLV 88, which may be a cadmium sulfide light valve or a thick silicon LCLV, for example. Its liquid crystal layer is substantially thicker than the liquid crystal layer of the main LCLV 86, thus exhibiting a significantly slower response. Because of its thicker construction and, in the case of the CdS-LCLV, the material which is utilized, LCLV 88 exhibits substantial spatial phase uniformity.

The system of FIG. 6 includes a main laser 90 for generating the primary laser beam referenced to the wavefront WF2 and an auxiliary or correction laser 92 for generating the laser beam referencing the wavefront WF1 that is used in the correction mode. A shutter control stage 94 is shown coupled to the two lasers 90, 92 to control alternate generation of the two laser beams.

In the operation of the system of FIG. 6 to develop the compensation or correction for the surface irregularities of the main LCLV 86, the feedback loop in the main system 80 is disengaged by disabling the main laser 90. During this interval, the correction laser 92 is used to drive the wavefront WF1 to zero. It will be seen that this wavefront corresponds to the spatial phase aberrations which are introduced by the main LCLV 86. The upper feedback loop of system 82 operates in the manner described above with respect to the system of FIGS. 1-5 to achieve this compensation. At the end of the correction or "set mode" interval, the wavefront WF1 will have been driven to zero. At this point, the control stage 94 is controlled to initiate the main operational phase in which the main laser 90 is activated while the correction laser 92 is disabled. During the main operational phase when the main laser 90 is active, the feedback loop of the main system 80 is enabled to provide the atmospheric aberration correction of the wavefront WF2 in the manner previously described.

Because the LCLV 88 of the correction system 82 is slow, relative to the response time of the LCLV 86 in the main system 80, the correction system continues to hold the modulation information which was developed during the set mode phase for a certain decay time period. This decay time can extend for a second or more and, for its duration, the main LCLV 86 will only have to correct for atmospheric aberrations, as the corrections of its own spatial phase aberrations are incorporated in the emerging wavefront WF2. A sequence of set and operation modes can be repeated with the maximum period set by the response (decay) time of the correction LCLV 88.

As an example of a practical application of such a pulsed-mode correction system, a thin LCLV 86 with an approximately 4-micron liquid crystal layer may be used with a thick LCLV 88 having a liquid crystal layer of approximately 40 microns. The thin LCLV will have a response time (open loop) of about 10 milliseconds with a closed loop response time of approximately 2.5 milliseconds. Corresponding response times for the thick LCLV 88 approximate one second and 25 milliseconds, respectively. An appropriate set mode period is thus approximately 25 milliseconds, after which the thick LCLV 88 is operated open loop during a decay interval of approximately one-third of its open loop response time, or about 300 milliseconds. Since the response time (closed loop) for the thin cell 86 is 2.5 milliseconds and assuming the need for ten such cycles for a full atmospheric correction period, it is appropriate to use a time corresponding to $300/25 = 12$ correcting periods before it becomes necessary to interrupt and set the thick LCLV 88 again. The idle period (set mode) for setting up the thick LCLV 88 is perhaps ten cycles of its closed-loop time, making it a total of approximately 250 milliseconds. There is thus a short period of time during which both the thick LCLV is compensated for its internal errors and the atmospheric path is compensated. This time period is quite sufficient to provide compensation of atmospheric turbulence for laser pulses which are transmitted within the period, since typical laser pulse widths are 1 to 10 microseconds. Thus it is entirely practical for atmospheric aberrations of the main wavefront to be corrected without being affected by the inherent spatial phase non-uniformities of the main correction LCLV through resort to the auxiliary correction system of the present invention as shown in FIG. 6. This sequence of setting the thick LCLV to correct the thin LCLV, setting the thin LCLV to compensate the propagation path, and transmitting a laser pulse to be corrected can be operated on a single shot basis or it may be temporally repeated.

A simple but effective solution has thus been disclosed to compensate for inherent aberrations normally introduced into a laser beam wavefront by the very device which is utilized for correction of atmospheric aberrations. Using an auxiliary system like the main system employed for correcting for atmospheric aberrations, together with an auxiliary laser which is pulsed in a short set mode interval alternatively with the longer period of the main laser, the LCLV auxiliary system develops the required phase correction pattern for the main LCLV and stores it for a decay time interval which is sufficient to enable the main LCLV to perform its atmospheric aberration correction without being affected by its own inherent non-linearities. The disclosed embodiment of the invention provides an optimum melding of the thin liquid crystal device, having the short response time which is needed for correction of atmospheric aberrations, with a thick liquid crystal device in the auxiliary correction system having a response time and decay interval appropriate to permit the main system to achieve its objective of correcting for atmosphere aberrations without interference from its own inherent non-uniformities.

Although there have been described above specific arrangements of apparatus and method for adaptive correction of the phase non-uniformity of a LCLV in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for correcting surface non-uniformities inherent in a liquid crystal light valve of a laser wavefront correcting system comprising:
    a main aberration correction system having a first liquid crystal light valve operatively coupled to a feedback portion for causing the liquid crystal light valve to adjust its reflective properties in a manner to drive to zero the atmospheric aberrations in a reference wavefront impinging thereon;
    an auxiliary correction system having a second liquid crystal light valve operatively coupled to a second feedback portion for causing the second liquid crystal light valve to adjust its reflective properties in a manner to store a phase correction pattern derived from the first liquid crystal light valve;
    means for directing a laser beam reflected from one of the liquid crystal light valves to the other liquid crystal light valve;
    a correction laser for directing a beam to the first liquid crystal light valve and thereafter by reflection to the second liquid crystal light valve and to the feedback portion of the auxiliary correction system for writing the phase correction pattern corresponding to the first liquid crystal light valve on the second liquid crystal light valve;
    a main laser coupled to direct a beam to the first liquid crystal light valve and to the feedback system associated therewith for controlling the first liquid crystal light valve to correct the wavefront of an atmospheric reference beam by driving the phase errors in said wavefront to zero; and
    means for alternatively activating the correction laser and the main laser to cause the auxiliary correction system to compensate for the inherent phase non-linearities of the main system for a period of time sufficient to correct for atmospheric aberrations in the reference beam.

2. The apparatus of claim 1 wherein the first liquid crystal light valve is a fast response silicon liquid crystal light valve.

3. The apparatus of claim 2 wherein the second liquid crystal light valve is a slow response cadmium sulfide liquid crystal light valve.

4. The apparatus of claim 2 wherein the first liquid crystal light valve is a thin silicon liquid crystal light valve and wherein the second liquid crystal light valve is a slow response thick silicon liquid crystal light valve.

5. The apparatus of claim 3 wherein the activating means comprise means for activating the correction laser during a set mode which is substantially greater than the response time of the first liquid crystal light valve.

6. The apparatus of claim 5 wherein the activating means comprise means for activating the main laser during an operation mode interval having a time period approximating the decay interval of the second liquid crystal light valve.

7. A method of compensating for surface non-uniformities inherent in a liquid crystal light valve of a laser beam wavefront correcting system comprising the steps of:
    applying a reference wavefront to a main aberration correction system having a first liquid crystal light valve;
    driving the liquid crystal light valve to assume the phase conjugate of an atmospheric reference wavefront so as to drive any wavefront error in the reference wavefront to zero;
    applying a correction beam to the first liquid light valve and to a second liquid crystal light valve coupled in an auxiliary correction system;
    using the correction beam to modify the second liquid crystal light valve so as to store therein a phase correction pattern corresponding to inherent surface irregularities in the first liquid crystal light valve; and
    directing the atmospheric reference waveform to both the first and second liquid crystal light valves in succession in order to eliminate the effect of the inherent surface non-uniformities of the first liquid crystal light valve on said reference wavefront.

8. The method of claim 7 including the step of applying the correction beam to the first and second liquid crystal light valves during a set mode interval while deactivating a main laser beam and thereafter activating the main laser beam during an operation mode while deactivating the correction beam.

9. The method of claim 8 wherein the step of applying the correction beam in the set mode interval includes applying it for a time interval which is substantially longer than the response time of the first liquid crystal light valve.

10. The method of claim 9 wherein the step of applying the main laser beam during the operation mode comprises applying said beam for an interval equal to a portion of the decay time of the second liquid crystal light valve.

* * * * *